United States Patent
Wey et al.

(10) Patent No.: US 9,618,902 B2
(45) Date of Patent: Apr. 11, 2017

(54) APPARATUS AND METHOD FOR GENERATING HOLOGRAM PATTERN

(71) Applicant: SAMSUNG ELECTRONICS CO., LTD, Suwon (KR)

(72) Inventors: Ho Cheon Wey, Seongnam (KR); Seok Lee, Hwaseong (KR); Dong Kyung Nam, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 13/886,816

(22) Filed: May 3, 2013

(65) Prior Publication Data

US 2014/0146373 A1    May 29, 2014

(30) Foreign Application Priority Data

Nov. 26, 2012 (KR) .................. 10-2012-0134351

(51) Int. Cl.
G03H 1/08 (2006.01)
G02B 5/32 (2006.01)
G03H 1/22 (2006.01)

(52) U.S. Cl.
CPC ............ *G03H 1/08* (2013.01); *G03H 1/0808* (2013.01); *G03H 2001/0825* (2013.01); *G03H 2210/13* (2013.01); *G03H 2210/30* (2013.01); *G03H 2210/44* (2013.01); *G03H 2210/452* (2013.01); *G03H 2210/56* (2013.01); *G03H 2226/02* (2013.01)

(58) Field of Classification Search
CPC .... G03H 1/2294; G03H 2210/30; G03H 1/08; G03H 1/2202; G03H 1/26; G03H 1/2645; G03H 2225/60; G03H 2001/0224; G03H 2210/33

USPC .......................... 359/1, 9, 15, 22, 23, 29, 32
See application file for complete search history.

(56) References Cited

U.S. PATENT DOCUMENTS

| | | |
|---|---|---|
| 2005/0057787 A1 | 3/2005 | Nakamura |
| 2006/0139710 A1 | 6/2006 | Schwerdtner |
| 2010/0149314 A1 | 6/2010 | Schwerdtner et al. |

FOREIGN PATENT DOCUMENTS

| | | |
|---|---|---|
| JP | 2002-49295 | 2/2002 |
| JP | 2005-181854 | 7/2005 |
| JP | 2010-2557 | 1/2010 |
| JP | 2010-501903 | 1/2010 |

(Continued)

OTHER PUBLICATIONS

Tomoyoshi Shimobaba et al., "Rapid Calculation Algorithm of Fresnel Computer-Generated-Hologram using Look-up Table and Wavefront-Recording Plane Methods for Three-Dimensional Display" Optics Express, vol. 18, No. 19, Sep. 13, 2010, pp. 19504-19509.

(Continued)

*Primary Examiner* — Jade R Chwasz
(74) *Attorney, Agent, or Firm* — NSIP Law

(57) ABSTRACT

Provided is an apparatus and method for generating a hologram pattern with a reduced amount of computation. The apparatus may include a reference depth layer setting unit configured or having a capacity to set a reference depth layer using data associated with a three-dimensional (3D) object, a first hologram pattern generating unit configured to generate a first hologram pattern corresponding to the 3D object in the reference depth layer, and a second hologram pattern generating unit configured to generate a second hologram pattern in a hologram plane using the first hologram pattern.

17 Claims, 8 Drawing Sheets

(56) References Cited

FOREIGN PATENT DOCUMENTS

| JP | 2010-139746 | 6/2010 |
|----|-------------|--------|
| JP | 2011-186072 | 9/2011 |
| KR | 10-2009-0010775 | 1/2009 |
| KR | 10-2012-0046904 | 5/2012 |
| KR | 10-2012-0054799 | 5/2012 |
| KR | 10-1169367 | 7/2012 |

OTHER PUBLICATIONS

Seung-Cheol Kim et al., "Effective Generation of Digital Holograms of Three-Dimensional Objects Using a Novel Look-up Table Method", Applied Optics, vol. 47, No. 19, Jul. 1, 2008, pp. D55-D62.

Seung-Cheol Kim et al., "Effective Reduction of the Novel Look-up Table Memory Size Based on a Relationship between the Pixel Pitch and Reconstruction Distance of a Computer-Generated Hologram", Applied Optics, vol. 50, No. 19, Jul. 1, 2011, pp. 3375-3382.

Peter Tsang et al., "Holographic Video at 40 Frames per Second for 4-Million Object Points", Optics Express, vol. 19, No. 16, Aug. 1, 2011, pp. 15205-15211.

P.W.M. Tsang et al., "Enhancing the Pictorial Content of Digital Holograms at 100 Frames per Second", Optics Express, vol. 20, No. 13, Jun. 18, 2012, pp. 14183-14188.

Extended European Search Report mailed Feb. 26, 2014 in corresponding European Application No. 13189726.6.

Case 1

Case 2

Case 1

Case 2

APPARATUS AND METHOD FOR GENERATING HOLOGRAM PATTERN

CROSS-REFERENCE TO RELATED APPLICATIONS

This application claims the priority benefit of Korean Patent Application No. 10-2012-0134351, filed on Nov. 26, 2012, in the Korean Intellectual Property Office, the disclosure of which is incorporated herein by reference.

BACKGROUND

1. Field

Example embodiments in the following description relate to an apparatus and method for generating a hologram pattern, and more particularly, to an apparatus and method for generating a hologram pattern with a reduced amount of computation.

2. Description of the Related Art

Holographic technology is a three-dimensional (3D) spatial imaging technology that represents a real 3D object accurately by recording phase information in light waves, as well as light intensity.

A process of generating digital holograms may compute a point source hologram or a Fresnel zone plate (FZP) for each point of a 3D object made up of spatial points, and may acquire a hologram pattern for the 3D object by integrating or synthesizing the computed point source holograms or FZPs.

However, a great amount of computation may be required to generate a hologram pattern because a hologram pattern represents recorded information, including phase information, regarding light.

Accordingly, there is a demand for a method of generating a hologram pattern requiring a small amount of computation.

SUMMARY

The foregoing and/or other aspects are achieved by providing an apparatus for generating a hologram pattern, the apparatus including a reference depth layer setting unit configured or having a capacity to set a reference depth layer using data associated with a three-dimensional (3D) object, a first hologram pattern generating unit configured to generate a first hologram pattern corresponding to the 3D object in the reference depth layer, and a second hologram pattern generating unit configured to generate a second hologram pattern in a hologram plane using the first hologram pattern.

The reference depth layer setting unit may be configured to set depth information of the reference depth layer such that a distance between the reference depth layer and a point in the 3D object is shorter than a distance between the hologram plane and the point.

The data associated with the 3D object may include one piece of data among color image data of the 3D object, depth image data of the 3D object, color image data corresponding to multiple views, and spatial data of the 3D object.

The reference depth layer setting unit may be configured to identify depth information of a point in the 3D object using the data associated with the 3D object, and to set depth information of the reference depth layer using the identified depth information of the point.

The reference depth layer setting unit may be configured to set the depth information of the reference depth layer based on one value among a average value, a median value, a maximum value, and a minimum value of depth information of points in the 3D object.

The first hologram pattern generating unit may be configured to generate the first hologram pattern corresponding to a point in the 3D object by duplicating a portion of the first hologram pattern.

The second hologram pattern generating unit may be configured to generate the second hologram pattern in the hologram plane by increasing a size of the first hologram pattern.

The reference depth layer setting unit may be configured to set, when the 3D object is plural, depth information of the reference depth layer such that a distance between the reference depth layer and a point in the 3D objects is shorter than a distance between the hologram plane and the point.

The foregoing and/or other aspects are also achieved by providing a method of generating a hologram pattern, the method including setting a reference depth layer using data associated with a 3D object, generating a first hologram pattern corresponding to the 3D object in the reference depth layer, and generating a second hologram pattern in a hologram plane using the first hologram pattern.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
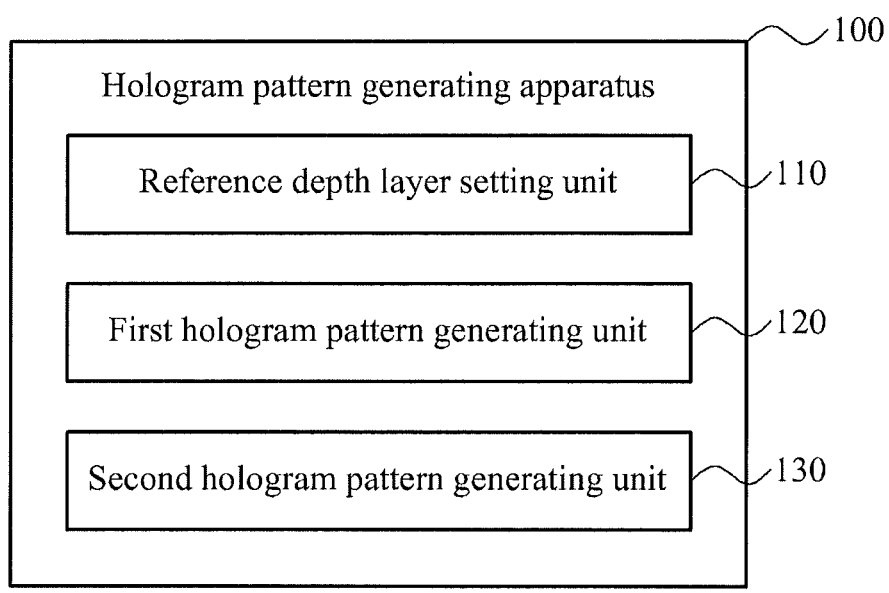
FIG. 1 illustrates an example of an apparatus for generating a hologram pattern.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an example of an apparatus 100, which may be a computer, for generating a hologram pattern.

In a hologram produced or displayed by a hologram display apparatus, a hologram plane may have hologram patterns generated corresponding to each point in a three-dimensional (3D) object. The size of the hologram pattern may be proportional to a distance between the hologram plane and a point in the 3D object. As the distance expands, an amount of computation required to generate the hologram pattern may increase, and as the distance becomes decreases, an amount of computation required to generate the hologram pattern may decrease.

To reduce an amount of computation required to generate a hologram pattern, the apparatus 100 for generating a hologram pattern may generate a hologram pattern in a reference depth layer located at a shorter distance from a 3D object than a distance from the 3D object to a hologram plane, and may generate a hologram pattern in the hologram plane by increasing a size of the hologram pattern generated in the reference depth layer based on a distance between the reference depth layer and the hologram plane.

Referring to FIG. 1, the apparatus 100 for generating a hologram pattern may include a reference depth layer setting unit 110, a first hologram pattern generating unit 120, and a second hologram pattern generating unit 130.

The reference depth layer setting unit 110 may set a reference depth layer using data associated with a 3D object. The data associated with the 3D object may include one piece of data among color image data of the 3D object, depth image data of the 3D object, color image data corresponding to multiple views, and spatial data of the 3D object obtained using a graphic tool. The data associated with the 3D object may correspond to discrete data.

The reference depth layer setting unit 110 may identify depth information of points in the 3D object using the data associated with the 3D object.

The reference depth layer setting unit 110 may set depth information of the reference depth layer such that a distance between the reference depth layer and a point in the 3D object is shorter than a distance between the hologram plane and the point.

The reference depth layer setting unit 110 may set the reference depth layer to be placed at one location among an inner part of the 3D object and a boundary of the 3D object.

The reference depth layer setting unit 110 may set the location of the reference depth layer using depth information of points in the 3D object. For example, the reference depth layer setting unit 110 may set the depth information of the reference depth layer using one value among a average value, a median value, a maximum value, and a minimum value of the depth information of the points in the 3D object.

The reference depth layer may be set to be placed at a location corresponding to a minimum amount of computation required to generate a first hologram pattern, and the location may refer to a sum of distances between the reference depth layer and the points in the 3D object, because an amount of computation required to generate a first hologram pattern is proportional to a distance between the reference depth layer and a point in the 3D object. Generally, a minimum sum of distances between the reference depth layer and all the points in the 3D object may correspond to an average value of the depth information of the points. Accordingly, the reference depth layer setting unit 110 may set an average value of the depth information of the points to be depth information of the reference depth layer as a default.

A method of setting the reference depth layer by the reference depth layer setting unit 110 is described in further detail later herein with reference to FIGS. 4 and 5.

When hologram patterns for a plurality of 3D objects are to be generated, the reference depth layer setting unit 110 may set a reference depth layer for each 3D object. The reference depth layer setting unit 110 may set a common reference depth layer of the 3D objects such that a distance between the reference depth layer and a point in the 3D objects is shorter than a distance between the hologram plane and the point.

A method of setting a reference depth layer for a plurality of 3D object is described in further detail later herein with reference to FIG. 5.

The first hologram pattern generating unit 120 of FIG. 1 may generate first hologram patterns corresponding to the 3D object in the reference depth layer set by the reference depth layer setting unit 110.

The first hologram pattern generating unit 120 may generate the first hologram patterns using a wave physics equation. The first hologram pattern generating unit 120 may generate the first hologram patterns using a hologram generation method based on a sub-hologram and radical symmetric interpolation (RSI).

When a wave physics equation is used, the first hologram pattern generating unit 120 may generate a first hologram pattern $o_p(\xi, \eta)$ based on Equation 1.

$$o_p(\xi, \eta) = \frac{a_p}{d_p} \exp(j(kd_p + \phi_p)) \quad \text{[Equation 1]}$$

where $a_p$ denotes an amplitude of the first hologram pattern, $\phi_p$ denotes a phase of the first hologram pattern, and k denotes a wave number of a reference beam. Here, k may be defined by $2\pi/\lambda$, wherein $\lambda$ denotes a wavelength of light in space, and $d_p$ denotes a distance between a point p of the 3D object and a point $(\xi, \eta)$ of the reference depth layer. Here, $d_p$ may be defined by Equation 2.

$$d_p = \sqrt{(\xi-x_p)^2 + (\eta-y_p)^2 + z_p^2} \text{ where } x_p, y_p \text{ and } z_p \text{ denote spatial coordinates.} \quad \text{[Equation 2]}$$

The first hologram pattern generating unit 120 may generate the first hologram patterns corresponding to the 3D object by applying Equation 1 to all the points in the 3D object.

When a hologram generation method based on RSI is used, the first hologram pattern generating unit 120 may generate the first hologram pattern corresponding to a point in the 3D object by duplicating a portion of the first hologram pattern.

The first hologram pattern generating unit 120 may compute a portion of the first hologram pattern rather than the entire first hologram pattern, duplicate the computed portion, and combine the duplicates at different directions. Accordingly, the first hologram pattern generating unit 120 may generate the first hologram pattern corresponding to the point by computing a portion of the first hologram pattern.

A method of generating the first hologram pattern using the hologram generation method based on RSI is described in further detail later herein with reference to FIG. 6.

The second hologram pattern generating unit 130 may generate a second hologram pattern in the hologram plane using the first hologram pattern.

The second hologram pattern generating unit 130 may generate the second hologram pattern in the hologram plane by increasing a size of the first hologram pattern. For example, the second hologram pattern generating unit 130 may generate the second hologram pattern by applying a Fourier transform or a fast Fourier transform to the first hologram pattern based on an approximation, for example, a Fresnel approximation, a Fraunhofer approximation, and the like.

The second hologram pattern generating unit 130 may generate the second hologram pattern by selecting a method of changing the size of the first hologram pattern at a ratio corresponding to a distance between the reference depth layer and the hologram plane, and by applying the selected method to the first hologram pattern.

Figure 2:
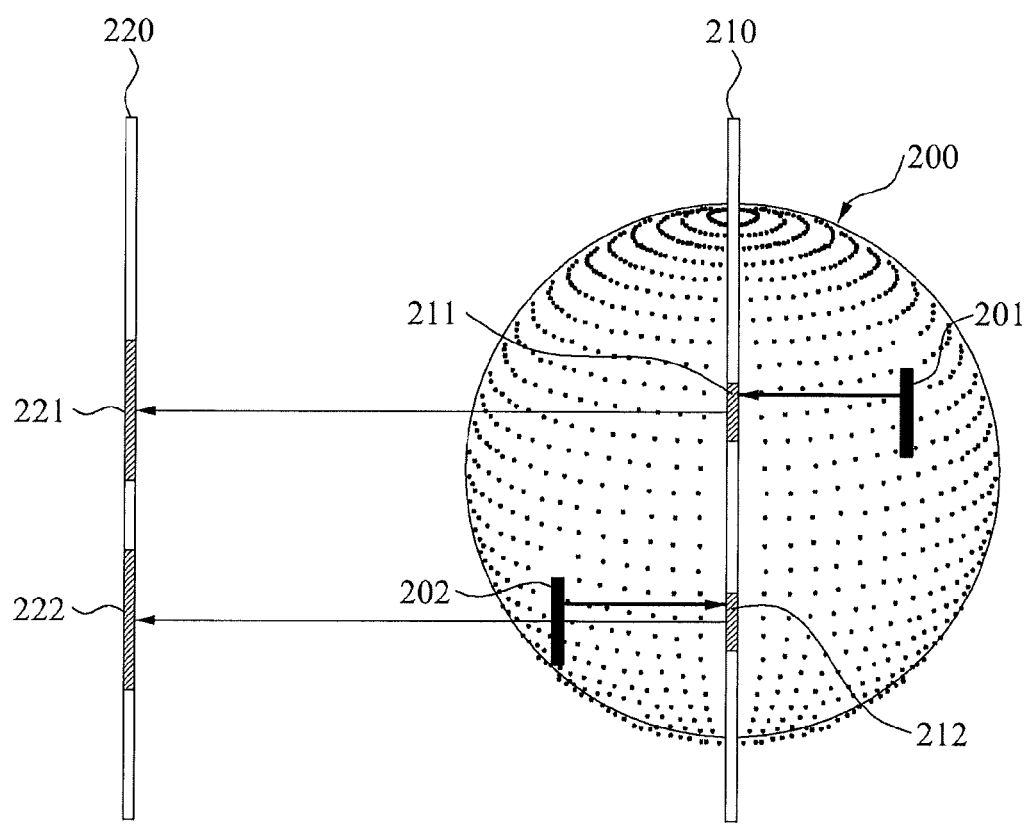
FIG. 2 illustrates an example of generating a hologram pattern.

FIG. 2 illustrates an example of generating a hologram pattern.

Referring to FIG. 2, the reference depth layer setting unit 110 may set depth information of a reference depth layer 210 based on a average value of depth information of points in a 3D object 200.

The reference depth layer setting unit 110 may identify the depth information or the depth of the points in the 3D object 200 using data associated with the 3D object 200, and may set the depth information or depth of the reference depth layer 210 based on a average value of the depth information of the points.

The first hologram pattern generating unit 120 may generate first hologram patterns corresponding to the points in the 3D object 200 in the reference depth layer 210.

For example, the first hologram pattern generating unit 120 may generate a first hologram pattern 211 corresponding to a first point 201 of the 3D object 200 in the reference depth layer 210, the first point 201 being located at an opposite side of the reference depth layer 210 with respect to the hologram plane 220. The first hologram pattern generating unit 120 may generate a first hologram pattern 212 corresponding to a second point 202 of the 3D object 200 in the reference depth layer 210, the second point 202 being located closer to the hologram plane 220 than the reference depth layer 210. A distance between the second point 202 and the hologram plane 220 may be shorter than a distance between the first point 201 and the hologram plane 220. However, the distance between the second point 202 and the hologram plane 220 may be longer than a distance between the second point 202 and the reference depth layer 210. Accordingly, an amount of computation required to generate the hologram pattern corresponding to the second point 202 in the reference depth layer 210 may be smaller than an amount of computation required to generate the hologram pattern corresponding to the second point 202 in the hologram plane 220.

The second hologram pattern generating unit 130 may generate second hologram patterns in the hologram plane 220 using the first hologram patterns. For example, the second hologram pattern generating unit 130 may generate a second hologram pattern 221 in the hologram plane 220 by increasing a size of the first hologram pattern 211. The second hologram pattern generating unit 130 may generate a second hologram pattern 222 in the hologram plane 220 by increasing a size of the first hologram pattern 212.

In a hologram, a hologram pattern representing the first point 201 may correspond to the second hologram pattern 221 rather than the first hologram pattern 211. In a case of the second hologram pattern 221 being generated from the first point 201, an amount of computation may increase in proportion to a size of the second hologram pattern 221. Accordingly, the apparatus 100 for generating a hologram pattern may reduce an amount of computation required to generate a hologram pattern by generating the first hologram pattern 211 corresponding to the first point 201 in the reference depth layer 210, and may reduce an amount of computation required to generate and display a hologram by generating the second hologram pattern 221 in the hologram plane 220 through the size change to increase the size of the first hologram pattern 211 generated in the reference depth layer 210.

Figure 3:
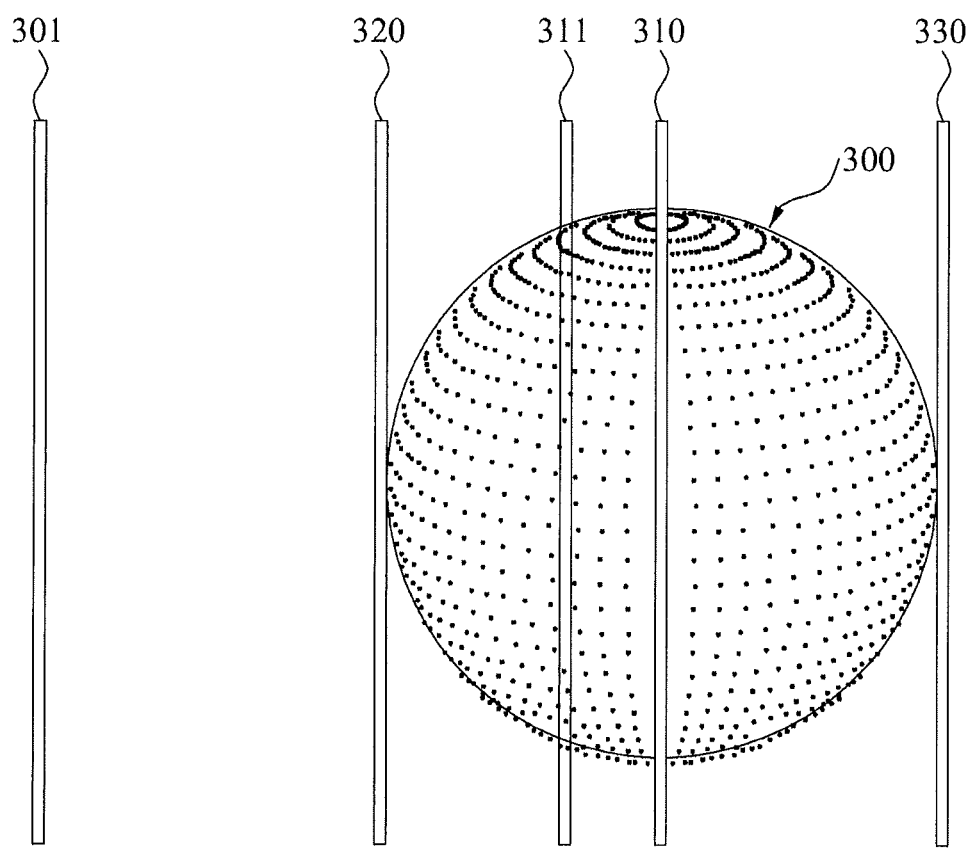
FIG. 3 illustrates an example of a location of a reference depth layer.

FIG. 3 illustrates an example of a location of a reference depth surface.

Referring to FIG. 3, the reference depth layer setting unit 110 may set a reference depth layer to be placed at one location among an inner part of a 3D object 300 and a boundary of the 3D object 300.

When the reference depth layer setting unit 110 sets depth information or depth of a reference depth layer 310 based on an average value or a median value of depth information of points in the 3D object 300, the reference depth layer 310 may be located at a center of the 3D object 300.

When the reference depth layer setting unit 110 sets depth information of a reference depth layer 311 based on a result of subtracting a predetermined constant from an average value or a median value of depth information of points in the 3D object 300, the reference depth layer 311 may be located between a center of the 3D object 300 and a boundary of the 3D object 300 in a direction facing a hologram plane 301 or closer to the hologram plane 301 than the center of the object 300.

When the reference depth layer setting unit 110 sets depth information of a reference depth layer 320 based on a minimum value of depth information or depth of points in the 3D object 300, the reference depth layer 320 may be located at a boundary of the 3D object 300 closest to the hologram plane 301.

When the reference depth layer setting unit 110 sets depth information of a reference depth layer 330 based on a maximum value of depth information or depth of points in the 3D object 300, the reference depth layer 330 may be located at a boundary of the 3D object 300 furthest from the hologram plane 301.

Figure 4:
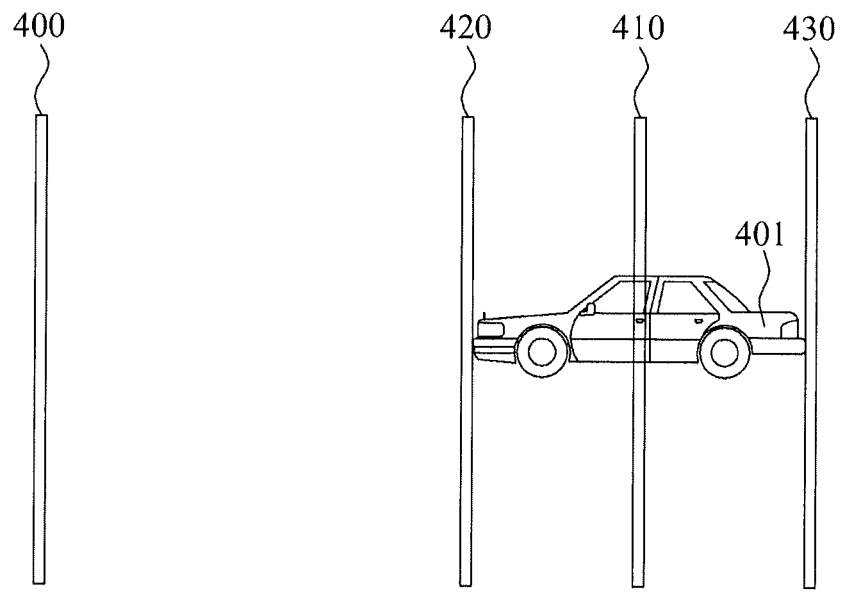
FIG. 4 illustrates an example of setting a reference depth layer based on a type of an object by a reference depth layer setting unit.
Figure 4:
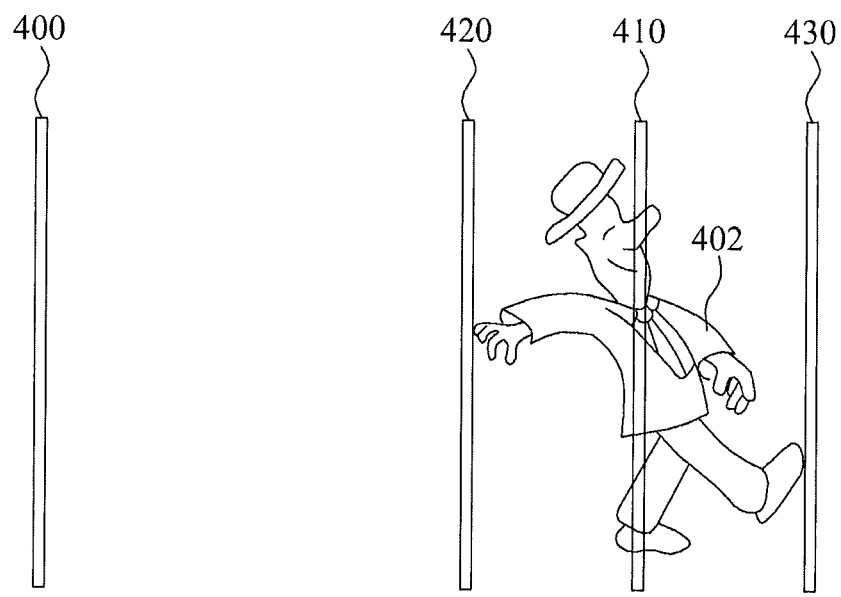

FIG. 4 illustrates an example of setting a reference depth layer based on a type of an object by the reference depth layer setting unit 110.

Referring to FIG. 4, the reference depth layer setting unit 110 may identify depth information of points in a 3D object using data associated with the 3D object, and may set a reference depth layer based on the identified depth information.

As shown in Case 1 (FIG. 4), when the 3D object corresponds to a car 401, the reference depth layer setting unit 110 may set a reference depth layer 410 based on a average value of depth information or depth of points on the car 401. The reference depth layer setting unit 110 may set a reference depth layer 420 based on a point having a minimum value of depth information among the points on the car 401. The reference depth layer setting unit 110 may set a reference depth layer 430 based on a point having a maximum value of depth information among the points on the car 401.

As shown in Case 2 (FIG. 4), when the 3D object corresponds to a person 402, depth information of the 3D object may vary based on a motion of the person 402, and a minimum value, a maximum value, a median value, and an average value of the depth information may be changed accordingly.

The reference depth layer setting unit 110 may identify a change in depth information of points in the person 402 using data associated with the person 402 in real time, and may set a reference depth layer based on the identified depth information. For example, the reference depth layer setting unit 110 may set a reference depth layer 410 to be located close to a body or a head of the person 402 based on an average value of the depth information or depth of the points in the person 402.

The reference depth layer setting unit 110 may set a reference depth layer 420 to be located close to a fingertip of the person 402 based on a point having a minimum value of the depth information among the points in the person 402. The reference depth layer setting unit 110 may set a reference depth layer 430 to be located close to a tip of a toe of the person 402 based on a point having a maximum value of the depth information among the points in the person 402. Accordingly, the location of the reference depth layer may be set differently based on a motion of the object changing over time.

Figure 5:
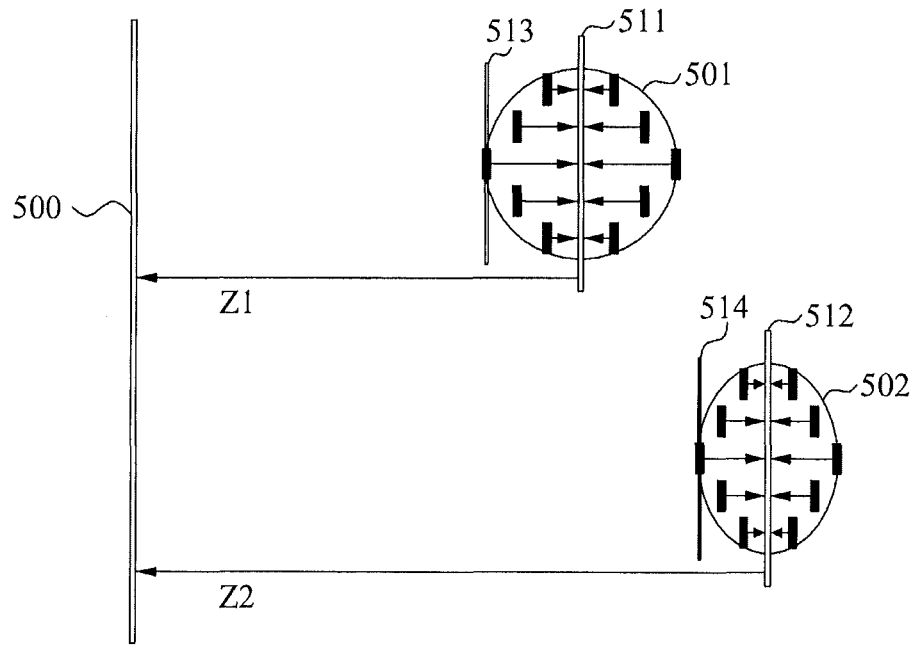
FIG. 5 illustrates an example of setting a reference depth layer for a plurality of objects by a reference depth layer setting unit.
Figure 5:
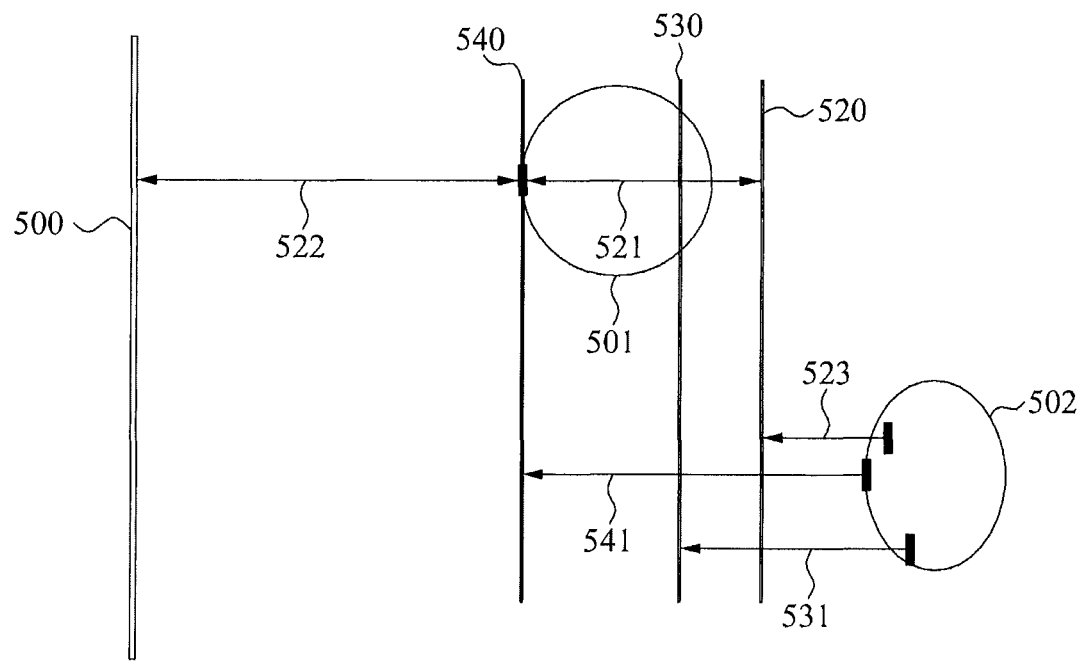

FIG. 5 illustrates an example of setting a reference depth layer for a plurality of objects by the reference depth layer setting unit 110.

Referring to FIG. 5, the reference depth layer setting unit 110 may set a reference depth layer for a plurality of 3D objects including a first object 501 and a second object 502.

As shown in Case 1 (FIG. 5), the reference depth layer setting unit 110 may set a reference depth layer for each of the first object 501 and the second object 502.

The reference depth layer setting unit 110 may set a reference depth layer 511 based on a average value of depth information of points in the first object 501. The reference depth layer setting unit 110 may set a reference depth layer 512 based on a average value of depth information of points in the second object 502. The reference depth layer setting unit 110 may identify a minimum value among the depth information of the points in the first object 501, and may set a reference depth layer 513 based on the identified minimum value. The reference depth layer setting unit 110 may identify a minimum value among the depth information of the points in the second object 502, and may set a reference depth layer 514 based on the identified minimum value.

As shown in Case 2 (FIG. 5), the reference depth layer setting unit 110 may set a common reference depth layer 520 of the first object 501 and the second object 502.

The reference depth layer setting unit 110 may set a reference depth layer 520 based on an average value of depth information of the first object 501 and depth information of the second object 502. In this instance, a distance between the reference depth layer 520 and a point in the first object 501 and the second object 502 may be shorter than a distance between a hologram plane 500 and the point.

For example, a distance 521 between the reference depth layer 520 and a point closest to the hologram plane 500 among the points in the first object 501 and the second object 502 may be shorter than a distance 522 between the hologram plane 500 and the point closest to the hologram plane 500.

In contrast, when the distance 522 is shorter than the distance 521, the reference depth layer setting unit 110 may set a reference depth layer 530 to be placed at such a location that the distance 521 is shorter than a distance between the reference depth layer 530 and a point closest to the hologram plane 500 in the first object 501.

The reference depth layer setting unit 110 may set a reference depth layer 540 based on a point closest to the hologram plane 500 among the points in the first object 501 and the second object 502 so that distances between the reference depth layer 520 and all the points in the first object 501 and the second object 502 may be shorter than distances between the hologram plane 500 and the points.

Figure 6:
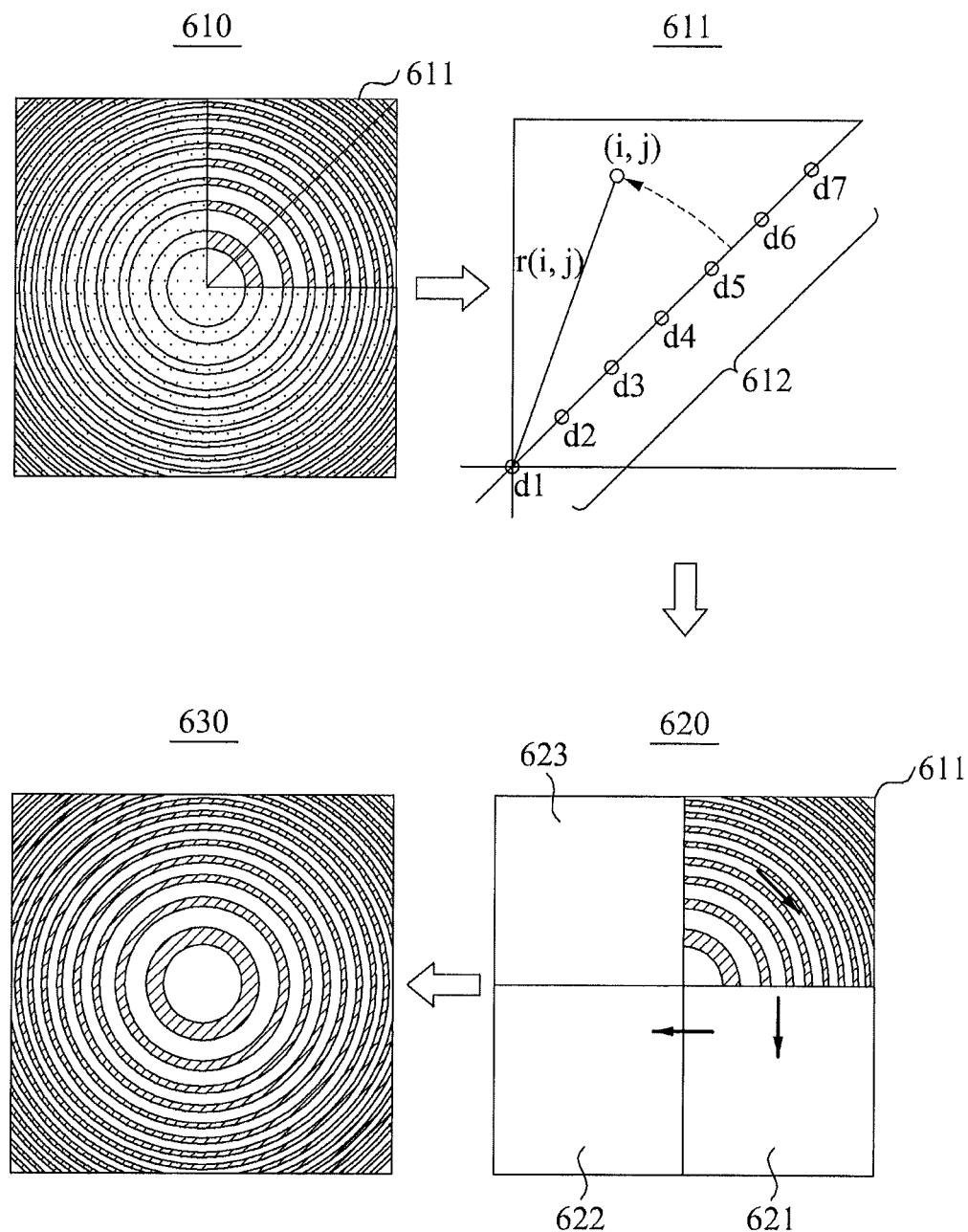
FIG. 6 illustrates an example of generating a first hologram pattern by a first hologram generating unit.

FIG. 6 illustrates an example of generating a first hologram pattern by the first hologram generating unit 120.

Referring to FIG. 6, in operation 610, the first hologram generating unit 120 may set a region 611 of interest in a first hologram pattern.

The first hologram generating unit 120 may generate a first hologram pattern corresponding to the region 611. The first hologram generating unit 120 may generate the first hologram pattern corresponding to the region 611 by computing points 612 representing thicknesses of concentric circles of hologram patterns, and by rotating the computed points 612.

In operation 620, the first hologram generating unit 120 may duplicate the first hologram pattern corresponding to the region 611.

The first hologram generating unit 120 may duplicate and rotate the first hologram pattern corresponding to the region 611 270 degrees to generate a first hologram pattern corresponding to a region 621. The first hologram generating unit 120 may duplicate and rotate the first hologram pattern corresponding to the region 611 180 degrees to generate a first hologram pattern corresponding to a region 622. The first hologram generating unit 120 may duplicate and rotate the first hologram pattern corresponding to the region 611 90 degrees to generate a first hologram pattern corresponding to a region 623.

In operation 630, the first hologram generating unit 120 may combine the first hologram patterns generated corresponding to the regions 611, 621, 622, and 623 to generate a first hologram pattern.

Figure 7:
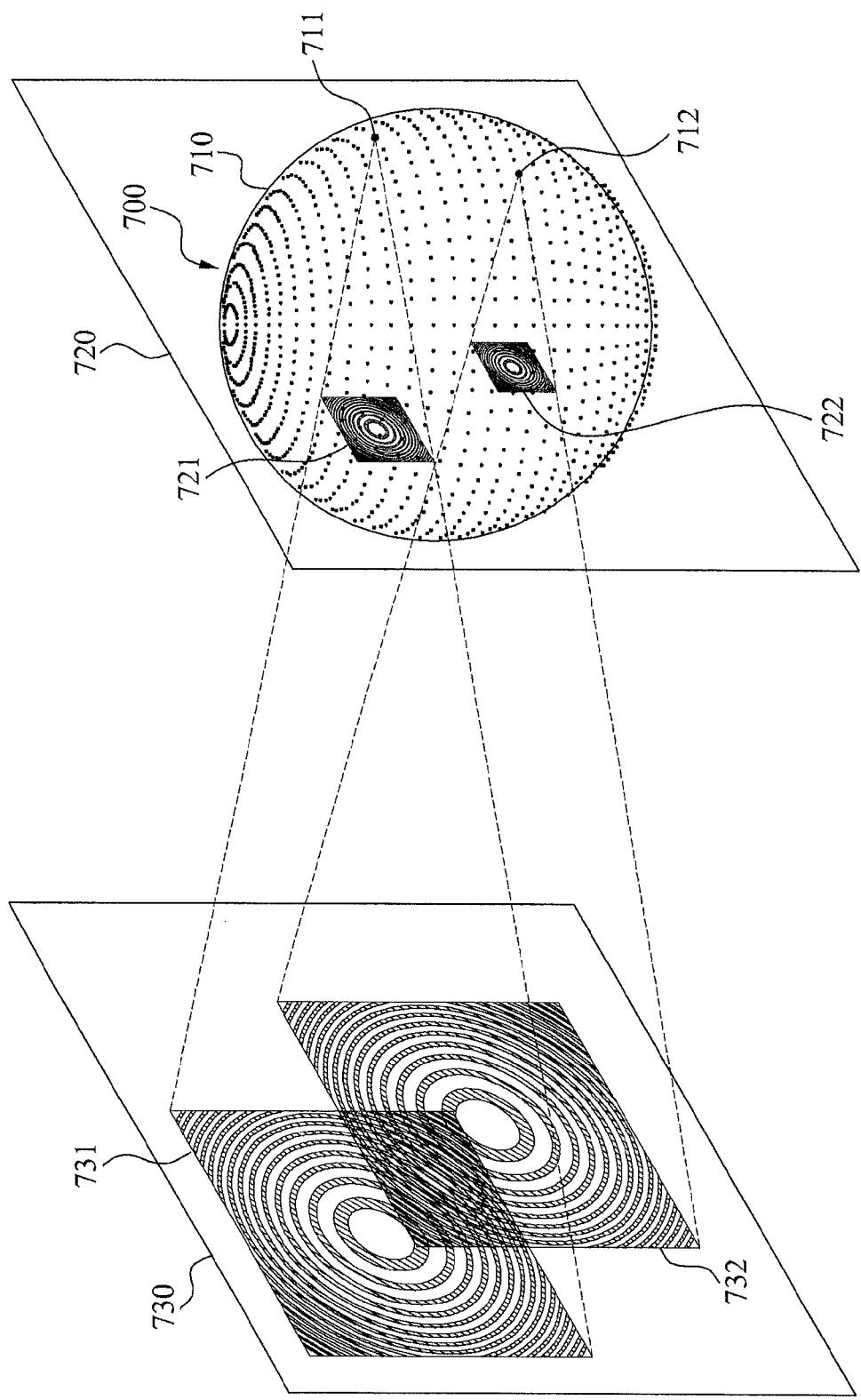
FIG. 7 illustrates an example of changing a size for hologram pattern generation.

FIG. 7 illustrates an example of changing a size for hologram pattern generation.

Referring to FIG. 7, the reference depth layer setting unit 110 may identify depth information or depth of points in a 3D object 700 using data associated with the 3D object, and may set a reference depth layer 720 based on a average value of the depth information of the points in the 3D object 700.

The first hologram generating unit 120 may generate a first hologram pattern corresponding to a point in the 3D object 700 in the reference depth layer 720. For example, the first hologram generating unit 120 may generate a first hologram pattern 721 corresponding to a first point 711 and a first hologram pattern 722 corresponding to a second point 712 in the reference depth layer 720.

The second hologram pattern generating unit 130 may generate a second hologram pattern in a hologram plane 730 using the first hologram pattern. For example, the second hologram pattern generating unit 130 may generate a second hologram pattern 731 in the hologram plane 730 by increasing a size of the first hologram pattern 721, and may generate a second hologram pattern 732 in the hologram plane 730 by increasing a size of the first hologram pattern 722.

Accordingly, the apparatus 100 for generating a hologram pattern may reduce an amount of computation required to generate a hologram pattern by generating the first hologram pattern 721 corresponding to the first point 711 in the reference depth layer 720 with a reduced size, and may reduce an amount of computation required to generate and display a hologram by generating the second hologram pattern 731 in the hologram plane 730 through the size change to increase the size of the first hologram pattern 721 having the reduced size generated in the reference depth layer 720.

Figure 8:
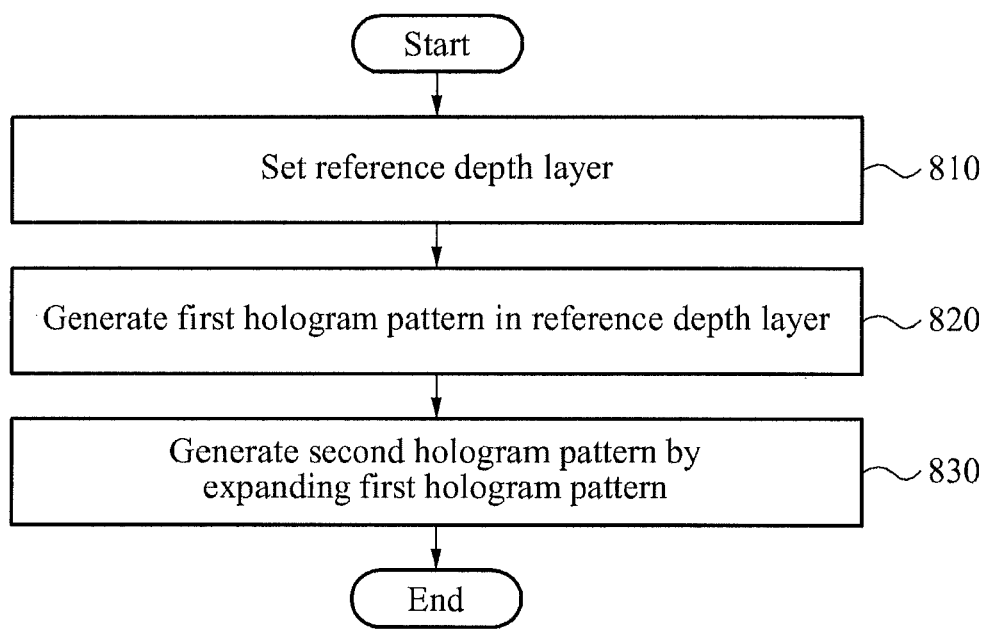
FIG. 8 is a flowchart illustrating a method of generating a hologram pattern according to an example embodiment.

FIG. 8 is a flowchart illustrating a method of generating a hologram pattern according to an example embodiment.

Referring to FIG. 8, in operation 810, the reference depth layer setting unit 110 may set a reference depth layer using data associated with a 3D object.

The reference depth layer setting unit 110 may identify depth information of points in the 3D object using the data associated with the 3D object, and may set the reference depth layer using the identified depth information of the points. For example, the reference depth layer setting unit 110 may set depth information or depth of the reference depth layer using one value among an average value, a median value, a maximum value, and a minimum value of the depth information of the points.

The reference depth layer setting unit 110 may set the depth information of the reference depth layer such that a distance between the reference depth layer and a point in the 3D object is shorter than a distance between a hologram plane and the point.

In operation 820, the first hologram pattern generating unit 120 may generate first hologram patterns corresponding to the 3D object in the reference depth layer set in the operation 810.

The first hologram pattern generating unit 120 may generate the first hologram patterns using a wave physics equation or a hologram generation method based on a sub-hologram and RSI.

In operation 830, the second hologram pattern generating unit 130 may generate second hologram pattern in a hologram plane using the first hologram patterns generated in the operation 820.

The second hologram pattern generating unit 130 may generate the second hologram pattern in the hologram plane by increasing a size of the first hologram pattern. For example, the second hologram pattern generating unit 130 may generate the second hologram pattern by applying a Fourier transform or a fast Fourier transform to the first hologram pattern based on an approximation, for example, a Fresnel approximation, a Fraunhofer approximation, and the like.

The second hologram pattern generating unit 130 may generate the second hologram pattern by selecting a method of changing the size of the first hologram pattern at a ratio corresponding to a distance between the reference depth layer and the hologram plane, and by applying the selected method to the first hologram pattern.

Accordingly, the method of generating a hologram pattern may reduce an amount of computation required to generate a hologram pattern by generating a first hologram pattern corresponding to a point of a 3D object in a reference depth layer located at a shorter distance from the 3D object than a distance from the 3D object to a hologram plane.

The methods according to the above-described embodiments may be recorded in non-transitory computer-readable media including program instructions to implement various operations by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for generating a hologram pattern, the apparatus comprising:
   a reference depth layer setting unit having a capacity to set a reference depth layer using data associated with a three-dimensional (3D) object, the reference depth layer setting unit setting the reference depth layer at an intermediate portion of the 3D object;
   a first hologram pattern generating unit having a capacity to generate a first hologram pattern corresponding to the 3D object in the reference depth layer; and
   a second hologram pattern generating unit having a capacity to generate a second hologram pattern in a hologram plane using the first hologram pattern,
   wherein the reference depth layer setting unit set depth information of the reference depth layer to be one of an average value and a median value of the depth information of the points in the 3D object.

2. The apparatus of claim 1, wherein the reference depth layer setting unit has a capacity to set depth information of the reference depth layer where a distance between the reference depth layer and a point in the 3D object is shorter than a distance between the hologram plane and the point.

3. The apparatus of claim 1, wherein the data associated with the 3D object includes a piece of data from among color image data of the 3D object, depth image data of the 3D object, color image data corresponding to multiple views, and spatial data of the 3D object.

4. The apparatus of claim 1, wherein the reference depth layer setting unit has a capacity to identify depth information of a point in the 3D object using the data associated with the 3D object, and to set depth information of the reference depth layer using the identified depth information of the point.

5. The apparatus of claim 1, wherein the first hologram pattern generating unit has a capacity to generate the first hologram pattern corresponding to a point in the 3D object by duplicating a portion of the first hologram pattern.

6. The apparatus of claim 1, wherein the second hologram pattern generating unit has a capacity to generate the second hologram pattern in the hologram plane by increasing a size of the first hologram pattern.

7. The apparatus of claim 1, wherein the reference depth layer setting unit has a capacity to set, when the 3D object is plural, depth information of the reference depth layer where a distance between the reference depth layer and a point in the 3D objects is shorter than a distance between the hologram plane and the point.

8. A device of claim 1, wherein the reference depth layer setting unit, the first hologram pattern generating unit and the second hologram pattern generating unit comprise a computer.

9. A method of generating a hologram pattern, the method comprising:
   setting a reference depth layer using data associated with a three-dimensional (3D) object, the reference depth layer being set at an intermediate portion of the 3D object;
   generating a first hologram pattern corresponding to the 3D object in the reference depth layer; and
   generating a second hologram pattern in a hologram plane using the first hologram pattern, wherein the setting of the reference depth layer comprises setting depth information of the reference depth layer to be one of an average value and a median value of the depth information of the points in the 3D object.

10. The method of claim 9, wherein the setting of the reference depth layer comprises setting depth information of the reference depth layer where a distance between the reference depth layer and a point in the 3D object is shorter than a distance between the hologram plane and the point.

11. The method of claim 9, wherein the data associated with the 3D object includes a piece of data among color image data of the 3D object, depth image data of the 3D object, color image data corresponding to multiple views, and spatial data of the 3D object.

12. The method of claim 9, wherein the setting of the reference depth layer comprises:
identifying depth information of a point in the 3D object using the data associated with the 3D object; and
setting depth information of the reference depth layer using the identified depth information of the point.

13. The method of claim 9, wherein the generating of the first hologram pattern comprises generating the first hologram pattern corresponding to a point in the 3D object by duplicating a portion of the first hologram pattern.

14. The method of claim 9, wherein the generating of the second hologram pattern comprises generating the second hologram pattern in the hologram plane by increasing a size of the first hologram pattern.

15. The method of claim 9, wherein the setting of the reference depth layer comprises setting, when the 3D object is plural, depth information of the reference depth layer where a distance between the reference depth layer and a point in the 3D objects is shorter than a distance between the hologram plane and the point.

16. A non-transitory computer-readable medium comprising a program for instructing a computer to perform the method of claim 9.

17. A method, comprising
creating a hologram pattern at a hologram plane by producing a first hologram pattern of a 3D object at a reference plane and producing a second hologram pattern from the first hologram pattern at the hologram plane by translating the first hologram pattern to the hologram plane and enlarging the first hologram pattern; and
displaying a hologram using the hologram pattern using a hologram display apparatus,
wherein depth information of a reference depth layer is set at an intermediate portion of the 3D object, and
wherein the depth information of the reference plane is set to be one of an average value and a median value of the depth information of the points in the 3D object.

* * * * *